US009054896B2

(12) United States Patent
Ould-Brahim

(10) Patent No.: US 9,054,896 B2
(45) Date of Patent: Jun. 9, 2015

(54) SVC-L2 VPNS: FLEXIBLE ON DEMAND SWITCHED MPLS/IP LAYER-2 VPNS FOR ETHERNET SVC, ATM AND FRAME RELAY

(75) Inventor: Hamid Ould-Brahim, Kanata (CA)

(73) Assignee: RPX Clearinghouse LLC, San Francisco, CA (US)

( * ) Notice: Subject to any disclaimer, the term of this patent is extended or adjusted under 35 U.S.C. 154(b) by 2175 days.

(21) Appl. No.: 10/658,701

(22) Filed: Sep. 9, 2003

(65) Prior Publication Data

US 2004/0049542 A1 Mar. 11, 2004

Related U.S. Application Data

(60) Provisional application No. 60/409,324, filed on Sep. 9, 2002.

(51) Int. Cl.

| | |
|---|---|
| G06F 15/16 | (2006.01) |
| G06F 15/177 | (2006.01) |
| G06F 15/173 | (2006.01) |
| H04L 12/46 | (2006.01) |
| H04L 12/751 | (2013.01) |
| H04L 12/723 | (2013.01) |

(52) U.S. Cl.
CPC ........ H04L 12/4675 (2013.01); H04L 12/4641 (2013.01); H04L 45/10 (2013.01); H04L 45/50 (2013.01)

(58) Field of Classification Search
CPC ..... H04L 63/0272; H04L 45/50; H04L 45/00; H04L 12/4641
USPC .......................... 709/220, 222–223, 225–229
See application file for complete search history.

(56) References Cited

U.S. PATENT DOCUMENTS

| | | | | |
|---|---|---|---|---|
| 6,662,221 | B1 * | 12/2003 | Gonda et al. | 709/223 |
| 7,467,215 | B2 | 12/2008 | Ould-Brahim | |
| 2002/0032766 | A1 * | 3/2002 | Xu | 709/223 |
| 2002/0186664 | A1 * | 12/2002 | Gibson et al. | 370/254 |
| 2003/0053450 | A1 * | 3/2003 | Kubota et al. | 370/356 |
| 2003/0112755 | A1 * | 6/2003 | McDysan | 370/230 |
| 2003/0115480 | A1 * | 6/2003 | McDysan | 713/201 |

OTHER PUBLICATIONS

Rosen, draft-ietf-ppvpn-l2vpn-00; "An Architecture for L2VPNs", Internet draft, Jul. 2001, pp. 1-12.
Ould-Brahim, draft-ouldbrahim-bgpgmpls-ovpn-01; "BGP/GMPLS Optical VPNs", Internet draft, Jul. 2001, pp. 1-15.
USPTO, Office Action dated May 14, 2007, regarding U.S. Appl. No. 10/657,939.
USPTO, Office Action dated Dec. 5, 2007, regarding U.S. Appl. No. 10/657,939.
USPTO, Advisory Action dated Feb. 20, 2008, regarding U.S. Appl. No. 10/657,939.
USPTO, Notification of Non-Compliant Appeal Brief (37 CFR 41.37), dated Jun. 5, 2008, regarding U.S. Appl. No. 10/657,939.

\* cited by examiner

*Primary Examiner* — Tae Kim

(74) *Attorney, Agent, or Firm* — Ridout & Maybee LLP

(57) ABSTRACT

A Layer-2 virtual private network arrangement and method is disclosed for switched virtual circuits. The switched virtual circuit Layer-2 VPN includes logical ports of two types, customer and provider, and port information tables to relate both types which provides simplified provisioning and a degree of customer autonomy regarding establishing virtual connections without the assistance of the service provider across the service provider's network. The switched virtual circuit Layer-2 VPN is particularly useful for overcoming the need for customers to store and manipulate provider addresses with respect to closed user groups as is done in existing Layer-2 VPNs known in the art.

34 Claims, 9 Drawing Sheets

| | VPN B L2PIT on PE 1 | | | VPN B L2PIT on PE 2 | | | VPN B L2PIT on PE 3 | | |
|---|---|---|---|---|---|---|---|---|---|
| | CPI | PPI | Additional Information | CPI | PPI | Additional Information | CPI | PPI | Additional Information |
| 701 | 10.1.1.1 | 16.1.1.1 | FR | | | | | | |
| 702 | 10.1.1.1 | 16.1.1.1 | FR | 10.1.1.3 | 16.1.1.7 | FR | | | |
| 703 | 10.1.1.1 | 16.1.1.1 | FR | 10.1.1.1 | 16.1.1.1 | FR | 10.1.1.2 | 16.1.1.5 | FR |
| | | | | 10.1.1.3 | 16.1.1.7 | FR | | | |
| 704 | 10.1.1.1 | 16.1.1.1 | FR | 10.1.1.1 | 16.1.1.1 | FR | 10.1.1.2 | 16.1.1.5 | FR |
| | 10.1.1.2 | 16.1.1.5 | FR | 10.1.1.3 | 16.1.1.7 | FR | | | |
| 705 | 10.1.1.1 | 16.1.1.1 | FR | 10.1.1.1 | 16.1.1.1 | FR | 10.1.1.1 | 16.1.1.1 | FR |
| | 10.1.1.2 | 16.1.1.5 | FR | 10.1.1.3 | 16.1.1.7 | FR | 10.1.1.2 | 16.1.1.5 | FR |
| | 10.1.1.3 | 16.1.1.7 | FR | | | | | | |
| 706 | 10.1.1.1 | 16.1.1.1 | FR | 10.1.1.1 | 16.1.1.1 | FR | 10.1.1.1 | 16.1.1.1 | FR |
| | 10.1.1.2 | 16.1.1.5 | FR | 10.1.1.2 | 16.1.1.5 | FR | 10.1.1.2 | 16.1.1.5 | FR |
| | 10.1.1.3 | 16.1.1.7 | FR | 10.1.1.3 | 16.1.1.7 | FR | | | |
| 707 | 10.1.1.1 | 16.1.1.1 | FR | 10.1.1.1 | 16.1.1.1 | FR | 10.1.1.1 | 16.1.1.1 | FR |
| | 10.1.1.2 | 16.1.1.5 | FR | 10.1.1.2 | 16.1.1.5 | FR | 10.1.1.2 | 16.1.1.5 | FR |
| | 10.1.1.3 | 16.1.1.7 | FR | 10.1.1.3 | 16.1.1.7 | FR | 10.1.1.3 | 16.1.1.7 | FR |

Figure 7

SVC-L2 VPNS: FLEXIBLE ON DEMAND SWITCHED MPLS/IP LAYER-2 VPNS FOR ETHERNET SVC, ATM AND FRAME RELAY

RELATED U.S. APPLICATION DATA

Provisional application No. 60/409,324 filed on Sep. 9, 2002.

FIELD OF THE INVENTION

The present invention relates to switched virtual circuit (SVC) virtual private networks (VPNs) and is particularly concerned with flexible, on-demand switched MPLS/IP Layer-2 VPNs for Ethernet, ATM and Frame Relay SVCs.

BACKGROUND OF THE INVENTION

A Virtual Private Network (VPN) may be thought of as a private network constructed within a shared network infrastructure. In common terminology, these private networks are used by clients while the network infrastructure is supplied by providers.

Existing varieties of switched Layer-2 VPNs have limitations affecting ease of implementation and use including:
- clients must store and manipulate provider addresses;
- clients need to be configured with all the provider addresses to which the client has a site attached;
- clients need to know about connection restrictions, such as for closed-user-group (CUG) values, and need to signal these values when establishing connectivity;
- clients encounter complexity in managing CUG rules; and
- clients need to implement an appropriate Layer-2 signalling mechanism proper to the transport technology.

In view of the foregoing, it would be desirable to provide a technique for providing switched virtual circuit virtual private networks (SVC VPNs) which overcomes the above-described inadequacies and shortcomings.

SUMMARY OF THE INVENTION

An object of the present invention is to provide an improved switched virtual circuit Layer-2 virtual private network arrangement.

According to an aspect of the present invention, there is provided a network for providing switched virtual circuit Layer-2 VPNs, wherein the network includes a set of elements interconnected by services; at least one first subset of said elements defining a private network; and at least one second subset of elements different from said first subset defining a provider network wherein at least two subgroups of said first subset of elements may be connected via said provider network. There are a plurality of customer ports maintained on the elements of the first subset of elements and a plurality of provider ports maintained on the second set of elements, each of the plurality of provider ports connected by data and signalling services to a customer port. At each element of the provider network having a provider port is a port information table containing mapping information relating addresses of customer ports to addresses of provider ports for the first subset of elements. The network also includes a provisioning mechanism used to define element membership in said first subset of elements and a signalling mechanism used to create Layer-2 connectivity between elements within said first subset of elements at the Layer-2 level across said second subset of elements.

Advantages of the present invention include constrained and/or restricted connectivity defined by the customer but maintained and enforced by the provider. As well, the present invention provides for on-demand Layer-2 circuit requests. The demands initiate with the SVC-L2VPN customer and require no coordination with the provider in the usual sense of adding connections. The client devices operate within the SVC-L2VPN space independently from the provider network operations in the sense of the provider network operations being transparent to the customer devices, yet connectivity is managed by the provider network relieving the customer of managing closed user groups. The present invention provides privacy and independence with respect to addressing, supporting an addressing unique to each SVC-L2VPN. The invention has the advantage of providing for single-ended provisioning, yet supports a multiservice Layer-2 switched model including Frame Relay, ATM, Ethernet, and Ethernet VLAN.

Conveniently the invention further provides for an auto-discovery mechanism for distributing said mapping information to port information tables of the provider network. This auto-discovery mechanism for distributing said mapping information uses Border Gateway Protocol in some instances.

In accordance with another aspect of the present invention, there is provided a method of organizing a network having a set of elements interconnected by services, wherein at least one first subset of the elements defines a private network and at least one second subset of elements different from the first subset defines a provider network and wherein at least two subgroups of the first subset of elements may be connected via the provider network, wherein the method includes the steps of defining element membership in the first subset of elements via a provisioning mechanism, establishing a plurality of customer ports within the elements of the first subset of elements and establishing a plurality of provider ports within the second set of elements. Each of the plurality of provider ports are connected by data and signalling services to a customer port. Thereafter, the step of establishing a port information table at each element of said provider network having a provider port, the port information table containing mapping information relating addresses of customer ports to addresses of provider ports, and creating Layer-2 connectivity within said first subset of elements at the Layer-2 level across said second subset of elements via a signalling mechanism.

The present invention further includes a method of organizing a network having a set of elements interconnected by services, wherein at least one first subset of the elements defines a private network, at least one second subset of elements different from the first subset defines a provider network and wherein at least two subgroups of the first subset of elements may be connected via said provider network. The method includes the steps of defining a L2VPN topology; establishing a plurality of customer ports within said elements of the first subset of elements; and establishing a plurality of provider ports within the second set of elements, each of the plurality of provider ports connected by data and signalling services to a customer port. Thereafter, the steps of creating a Layer-2 Port Information Table for each provider port; establishing the identity of customer ports attached to each provider port, and populating the Layer-2 Port Information Table at that provider port with mapping information relating addresses of customer ports to addresses of provider ports. Subsequently, the mapping information is distributed to the Layer-2 Port Information tables of the provider network via an auto-discovery mechanism. The method then creates Layer-2 connectivity within the first subset of elements at the Layer-2 level across the second subset of elements via a signalling mechanism upon request from an element within the first subset of elements.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which:

FIG. 7 is a set of Layer-2 Port Information Tables depicting addressing updates via a BGP mechanism according to an alternative embodiment of the invention;

DETAILED DESCRIPTION

Figure 1:
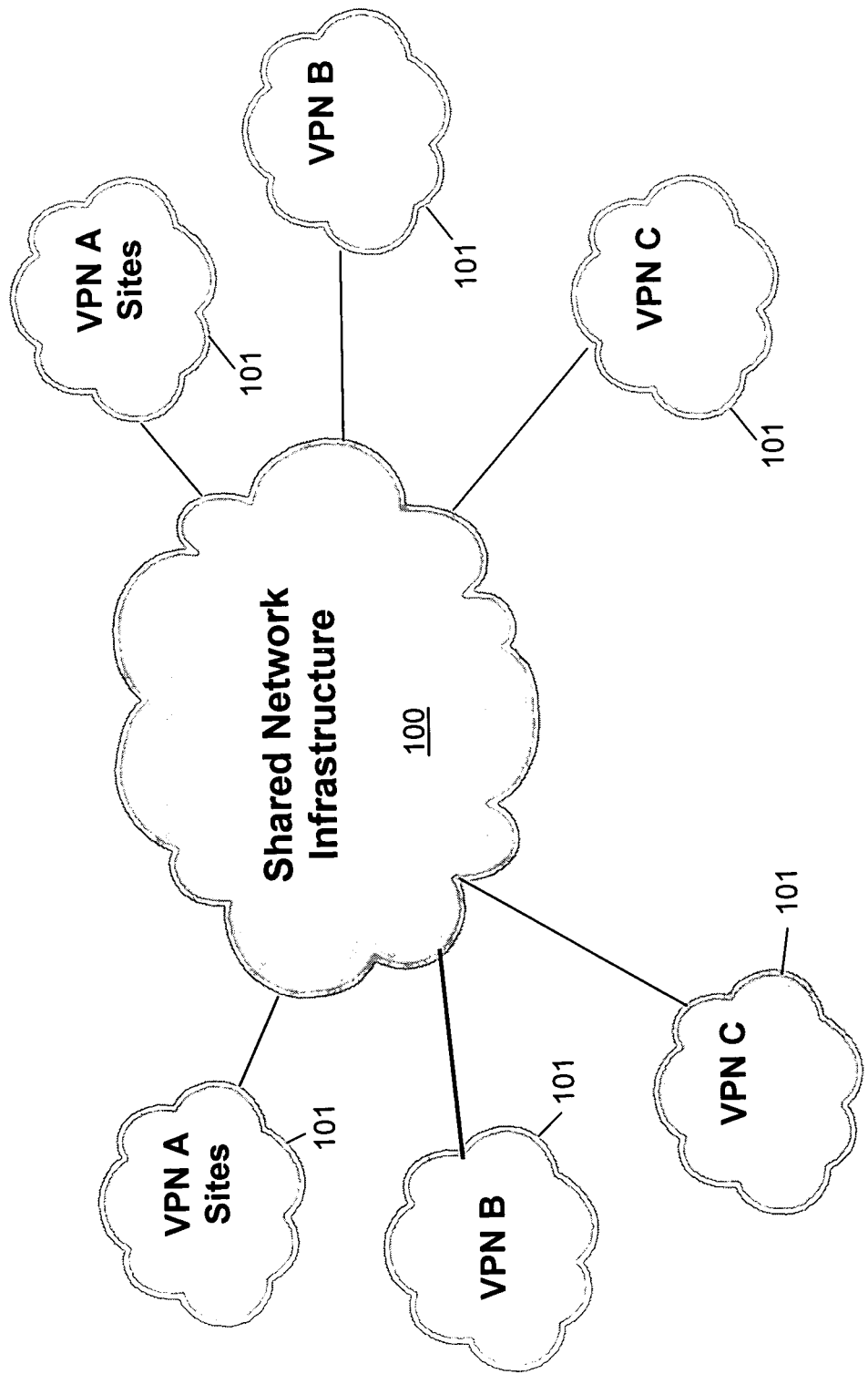
FIG. 1 is a diagram of a generic network having a shared network infrastructure and Virtual Private Networks associated thereto.

Glossary of Acronyms Used
P—Provider Device
PE—Provider Edge Device
CE—Customer Edge Device
SVC—Switched Virtual Circuit
CPI—Customer Port Identifier (Layer-2)
PPI—Provider Port Identifier (Layer-2)
PIT—Port Information Table
L2PIT—Layer-2 Port Information Tabl2
BGP—Border Gateway Protocol
BGP-AD—BGP Auto-Discovery
MPLS—Multi-Protocol Label Switching
DLCI—Data Link Connection Identifier
LMP—Link Management Protocol
ISP—Internet Service Provider Referring to FIG. 1, there may be seen a generic network having a shared network infrastructure 100 with connected virtual private network sites 101. The VPN sites 101 make use of the network infrastructure 100 to interconnect physically remote sub-networks of particular VPNs.

Figure 2:
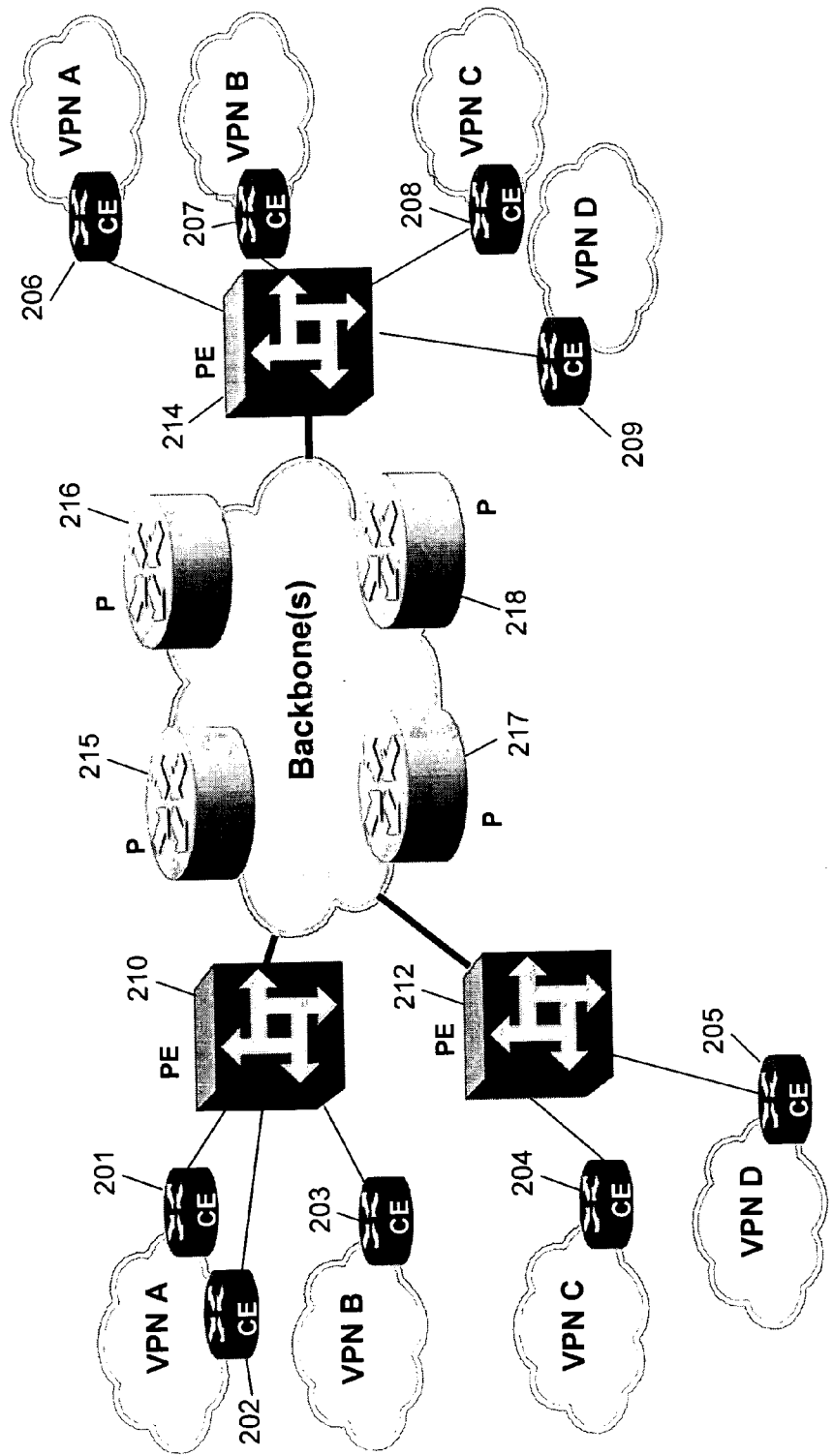
FIG. 2 is a diagram of a network reference model including a plurality of customer edge devices, provider edge devices, and provider devices within the network.

Referring to FIG. 2, there may be seen a network reference model showing a more detailed depiction of a network having a plurality of customer edge router/switches (CEs) 201, 202, 203, 204, 205, 206, 207, 208 and 209. The provider network has provider edge router/Layer-2 switches (PEs) 210, 212, and 214 as well as provider devices (P) 215, 216, 217, and 218 interior to the provider network.

Further in FIG. 2 may be seen the typical case where VPN A has a portion connected to CEs 201 and 202, and another portion connected to CE 206. Communication services between these remote portions of VPN A will be provided by the provider network. The same general situation obtains for VPN B, VPN C, and VPN D.

In operation, the Switched Virtual Connection Layer-2 VPN (SVC-L2VPN) is a provider-based Layer-2 VPN service that allows clients to request on-demand Layer-2 circuits characterized by:
  a given topology;
  using IP/MPLS based signalling between CE-PE;
  the possible employment of Link management protocol (LMP) for Layer-2 link-port consistency;
  use of private addresses which have the potential to be overlapping with other addresses in other VPNs; and
  the capacity to be built using single-sided signalling and auto-discovery mechanisms as, for example, being standardized in IETF.

In one contemplated embodiment, IP/MPLS is used between CE and PE to convey signalling information, and between PEs (for example when the provider network is using IP/MPLS-based tunnelling).

A formulaic description would be as follows:

$$SVC\ MPLS/IP\ L2VPN \equiv SVC+(G)MPLS+IP+VPN\ Constructs$$

where:
  SVC implements the private switched model;
  (G)MPLS provides signalling for Layer-2 connections;
  IP is the IP control channel; and
  VPN Constructs are services such as VPN membership, overlapping 'addresses, VPN auto-discovery, etc.

Under SVC-L2VPNs, the following capabilities are provided:
  Constrained/Restricted Connectivity:
    as defined by customer; and
    as maintained/enforced by the service provider.
  On-Demand L2 Circuit Request:
    controlled by the SVC-L2VPN customer;
    able to require no co-ordination with the service provider;
    client devices operate within the SVC-L2VPN space independently from the service provider network operations; and
    able to be subject to constrained/restricted connectivity.
  Privacy/Independence with Respect to Addressing within VPN.
  Single Ended Provisioning.
  Multi-Serviced Layer-2 Switched Model:
    including for example, ATM, Frame Relay, Ethernet, and Ethernet VLAN (PPP, HDLC, etc.).

The use of an SVC-L2VPN allows for simplified provisioning. In the addition of a new port to a given SVC-L2VPN, the configuration and provisioning changes only on the PE that has this port. Typically BGP would be used to distribute the information to other PEs having ports of the given SVC-L2VPN. Likewise, BGP would also be used to distribute this information to other CEs that have ports of the given SVC-L2VPN. In terms of establishing/terminating a Layer-2 connection between a pair of ports in a given SVC-L2VPN, the client could execute the connection without involving configuration/provisioning changes in any of the Provider equipment by using (G)MPLS signalling.

A number of benefits for both client and provider are associated with SVC-L2VPNs as compared to legacy Layer-2 VPNs.

Advantages to the VPN Customer on the client side include:
- compatibility with access clients that are 'MPLS/IP' signalling based;
- support for overlapping and/or private address space;
- support of Layer-3 addresses within the L2VPN (does not require transport Layer-2 addresses);
- provides High Mobility capability in that the client can move its L2VPN from one port to the other without changing the addressing of the L2VPN and without changing the L2VPN addressing, QoS, etc., thus offering a greater flexibility for network operations such as ATM to Ethernet, for example;
- L2VPN addresses can be used for client Layer-3 networking;
- support for a range of security capabilities including the Layer-2 security;
- support for a range of QoS capabilities that includes Layer-2 VPNs QoS
- support for the SVC-L2VPN circuit to be used as a legacy Layer-2 circuit or as an MPLS LSP within the client network if needed; and
- does not require the client to implement full MPLS but just signalling protocol at the edges.

Advantages to the Service Provider on the provider side include:
- opportunity for new revenue opportunities to the ISPs;
- support for Dynamic Membership distribution to ease circuit configuration and distribution;
- capable of interworking with existing legacy Layer-2 VPNs;
- provides opportunity to maximize yield from network investment on legacy layer-2 and IP/MPLS based infrastructure;
- leverages existing provider skill level in layer-2 VPNs;
- avoids requirement for tunnelling (including MPLS) between PE-PE (only when MPLS is used in the core);
- support for reusing (G)MPLS for link, port constructs;
- support for single-sided signalling; and
- allows Provider network operations to be completely decoupled from the customer L2VPNs unlike the case for legacy switched L2VPNs.

The SVC-L2VPN protocol requirements are as follows:
at the CE:
- support for MPLS signalling, for example RSVP-TE with SVC-L2VPN extensions but not necessarily MPLS forwarding; and
- IP-based control channel, for example, IP tunnelling.

at the PE:
- IP based control channel;
- MPLS signalling; and
- optionally an auto-discovery mechanism.

The SVC-L2VPN VPN Architecture Components may be summarized as follows:
- Access is Layer-2
- Require an IP-based control channel for signalling purposes for port control such as RSVP-TE or CR-LDP, and LMP can be used between CE-PE;
- Layer-2 discovery mechanism using the Layer-2 discovery for the Layer-2 port information;
- Membership is defined in the same way as existing Layer-2 VPNs wherein the route-target or more precisely a global unique identifier identifies the destination address;
- Ports and links are logical constructs that uses (G)MPLS functions; and
- Signalling is MPLS based (packet side only) between CE-PE.

The SVC-L2VPN Building Blocks may be summarized as follows:
- Customer and Provider Ports;
- A Layer-2 Port Information Table (L2PIT) which maintains mapping between customer ports and provider ports (at the edges of the service provider network) provides local CEs with the information about other ports in the SVC-L2VPN, and is defined on a per SVC-L2VPN basis or for all the SVC-L23VPNs connected to PE;
- a Layer-2 BGP based auto-discovery mechanism (BGP-AD) used to determine and distribute information related to customer and provider ports to the PEs, and to populate the L2PIT with this information; and
- an MPLS-signalling mechanism (preferably GMPLS based although other mechanisms may be used) to create connectivity within the set of client devices that are part of the same VPN at the Layer-2 level.

In the SVC-L2VPN, connectivity is constrained/restricted by the Provider. The Customer may select any SVC-L2VPN topology within a defined set where the set is controlled by the customer. The set may include hub-and-spoke, full-mesh, or other topologies. The provider restricts the customer's L2VPN topology to only the one in the set defined by the customer.

In the SVC-L2VPN discovery occurs via a two-step mechanism of:
- User-Side Port information discovery which is concerned with discovery of remote Layer-2 ports; and
- Network-side VPN discovery which is concerned with discovery of customer and provider port information.

Note that BGP multiprotocol extensions may be used as well as other discovery mechanisms such as DNS.

As part of the SVC-L2VPN, Customer and Provider ports are logical constructs. The Ports represent grouping of physical resources with similar characteristics for the purpose of switched L2VPN service. A single port may multiplex several Layer-2 connections.

There is a flexible relationship between physical ports, ports, links, link-bundles, channels and sub-channels and SVC-L2VPNs. A single physical port or fiber can support multiple links (e.g. multiple wavelengths per fiber, where each wavelength would be in its own SVC-L2VPN). Multiple physical ports can be combined to form one logical port. Ports within an VPN need not have the same characteristics. For example, it is possible to link Ethernet to ATM, FR to ATM, FR to Ethernet, etc. This allows maximum interworking capabilities. Administrative ownership of ports is orthogonal to the SVC-L2VPN membership of these ports and, because of this, ports within an VPN could belong to the same (intranet) or different (extranet) organizations.

Figure 3:
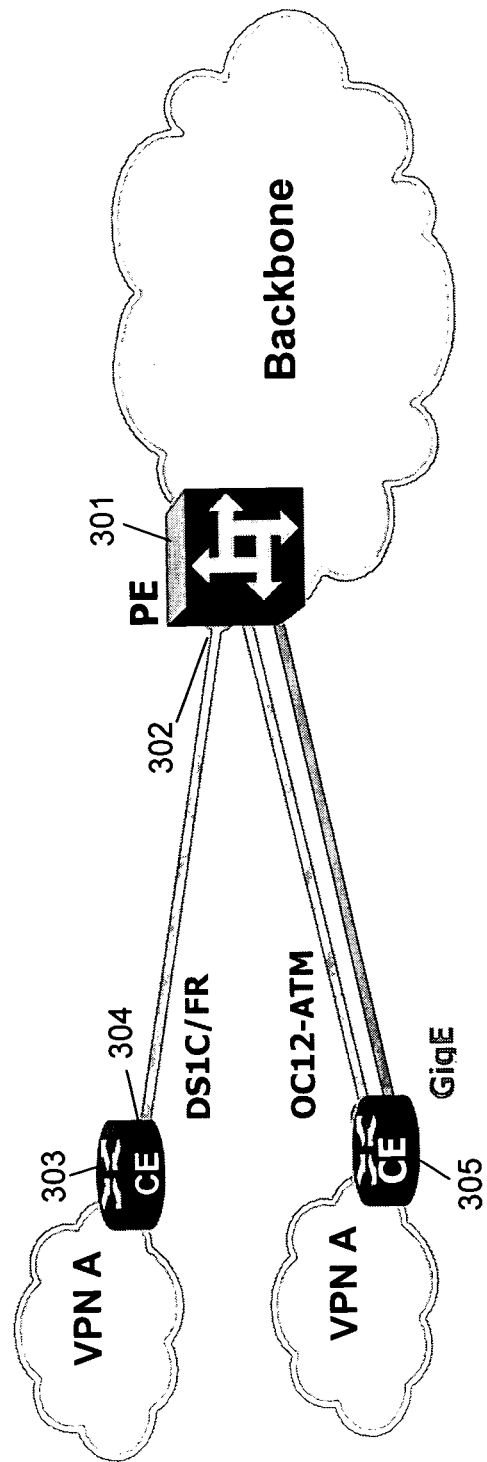
FIG. 3 is a diagram of the relation between Customer Ports and Provider Ports according to an embodiment of the invention.

Referring to FIG. 3, there is depicted a sub-network at the edge of a provider network having a PE 301 which connects to a first CE 303 and a second CE 305. The Customer Port connects a Customer Device to the Service Provider. It forms the basic unit of switched L2VPN membership. A given port can be in exactly one VPN; however, a given CE may of course have ports from different VPNs. A particular Customer Port 304 at the connection of CE 303 and PE 301 is indicated.

The Provider Port connects a PE to a Customer Device. It forms the basic unit of L23VPN membership. A given port can be in exactly one L2VPN; however, a given PE may have ports from different L2VPNs. Association with a particular L2VPN is established and maintained by the Provider's provisioning system, and is susceptible to being changed only by the Provider's provisioning system. A particular Provider Port 302 at the connection of PE 301 and CE 303 is indicated.

In the SVC-L2VPN, addressing and routing used by the Provider network offering the service is completely independent from the addressing and routing used by the SVC-L2VPN clients of that network. For the purpose of the SVC-L2VPN service, addressing and routing used by one SVC-L2VPN client need not be co-ordinated with any other SVC-L2VPN clients. Several choices of addresses can be used between CE-PE such as IPv4, IPv6, or NSAP (encoded in IPv6, as per RFC1888).

Port information contains addressing information and may also include information about the characteristics of the data link within that port.

Customer Ports are identified by the Customer Port Identifier (CPI). The CPI could be either an address or a tuple such as <CE address, CE port index>. The CPI is unique within a given SVC-12VPN, but need not be unique across multiple SVC-L2VPNs. The optional additional information about characteristics of the data link within that port may include items such as type (Frame Relay, ATM), bandwidth, total unreserved bandwidth within the port, etc.

Provider Ports are identified by the Provider Port Identifier (PPI). The PPI could be either an address or a tuple such as <PE address, PE port index>. The PPI is unique within a Provider. When used with legacy L2VPN, the PPI can conveniently be NSAP, E.164, or X.121.

The addressing and routing used by the Provider network offering the service is independent from the addressing and routing used by the SVC-L2VPN clients of that network. For the purpose of the SVC-L2VPN service, addressing and routing used by one SVL-L2VPN client need not be coordinated with an other SVC-L2VPN clients. Several choices of addresses may be used between CE and PE including for example IPv4, IPv6, and NSAP.

The VPN-PPI identifies a Provider Port (attached to the CE) using an address taken from the customer network (i.e., unique only within that VPN).

In operation, an SVC-L2VPN service may be built by the following steps:

Define a set of L2VPN topologies;

2) Create a L2PIT for L23VPN service;

3) Connect Customer Ports to Provider Ports;

4) Learn the identity of the attached customer ports at each PE;

5) Populate the L2PIT with remote port information via an auto-discovery mechanism;

6) Learn at each CE about port information related to other CEs which are members of the same L23VPN and part of a common L2VPN topology set; and 7) Request, initiated from the CEs to the service provider, to establish a Layer-2 connection to other CEs within the same SVC-L2VPN.

In normal practice, the customer defines the set of potential SVC-L2VPN topologies. This is normally expressed in terms of a set of customer ports and potential connectivity among the ports within the set. A wide range of topologies is contemplated such as hub-and-spoke, full-mesh, or arbitrary. Once defined by the customer, the Provider is responsible for restricting the customer's SVC-L2VPN topology to members in the set defined by the customer.

To create an L2PIT for SVC-L2VPN, it is necessary to configure an L2PIT on the PE, associate a list of export/import communities to the L2PIT according to the set of SVC-L2VPN topology selected, and populate L2PIT with port information.

Each L2PIT on a PE is populated from two sources:

the Customer-Port-to-Provider-Port mapping information for the Customer Ports connected to the attached PE; and the Customer-Port-to-Provider-Port mapping information for the Customer Ports connected to other PEs.

For the Customer-Port-to-Provider-Port mapping information for the Customer Ports connected to the attached PE, only the ports that belong to the SVC-L2VPN are associated with the L2PIT. The use is local to the PE information. This information is distributed to other PEs having ports belonging to the SVC-L2VPN by exporting this information into BGP, and tagging it appropriately with a specific "export" community.

For the Customer-Port-to-Provider-Port mapping information for the Customer Ports connected to other PEs, only the ports belonging to the SVC-L2VPN associated with the L2PIT are associated. This information is carried by the auto-discovery mechanism using BGP (with multi-protocol extensions).

For populating the L2PIT via an auto-discovery mechanism, BGP Auto-Discovery (BGP-AD) allows automatic discovery of SVC-L2VPN members with their associated port information. BGP-AD is used to populate the L2PITs with other port information (for non-local PEs). BGP Multi-protocol extensions are used to carry port information. BGP route filtering (based on BGP Extended Communities) is used to restrict distribution of this information to only the PITs of that SVC-L2VPN. Only the BGP routes with communities matching the import communities are used to populate the L2PIT.

Figure 4:
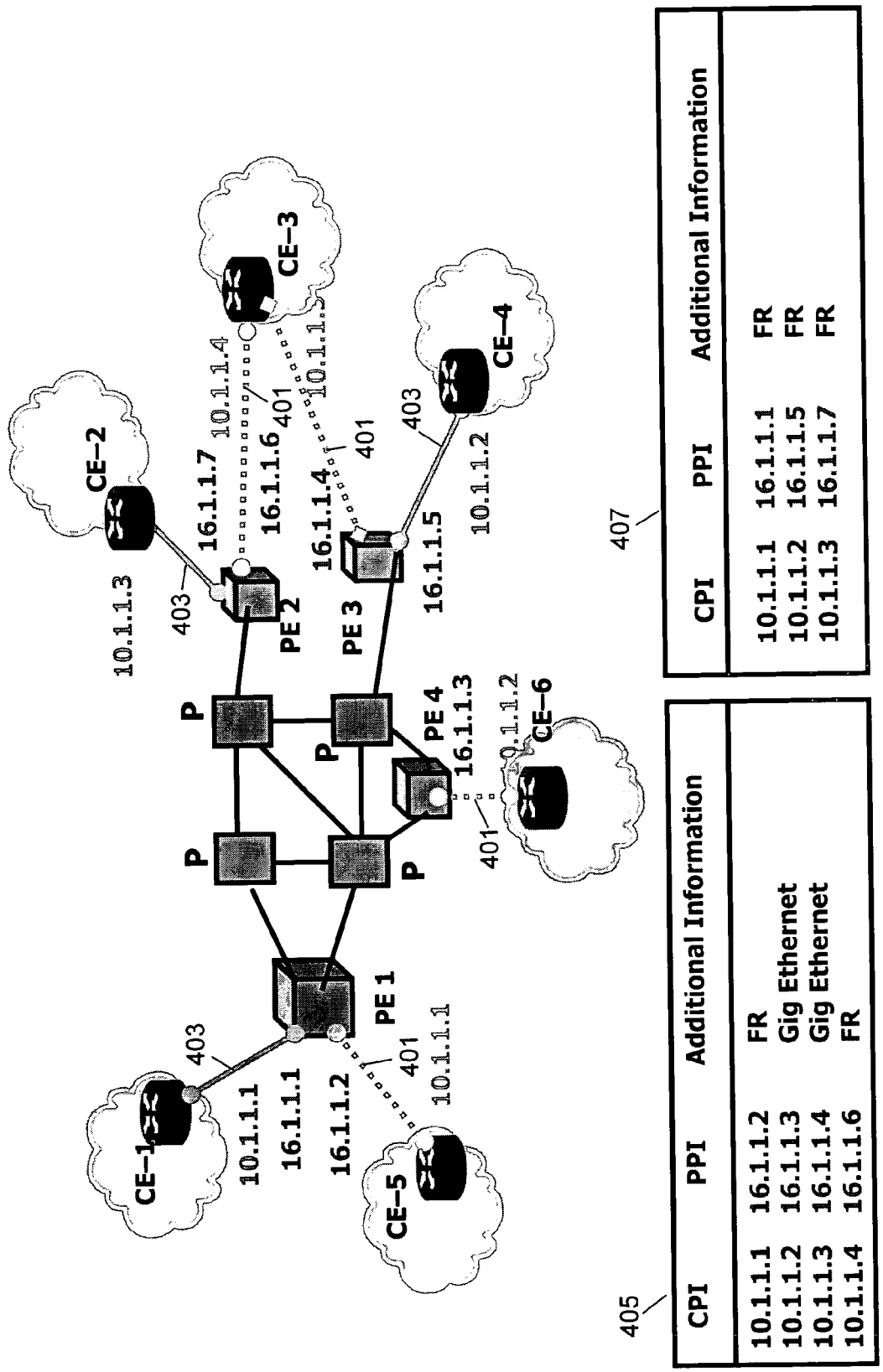
FIG. 4 is a diagram of a network depicting network addresses and Port Information Tables according to an embodiment of the invention.

Referring to FIG. 4, example L2PITs for two different VPNs may be seen for the network with addresses as indicated. On FIG. 4, the dashed lines 401 represent connections established for VPN A and the solid lines 403 represent connections established for VPN B. L2PIT 405 shows the four address pairs and additional information for VPN A on PE 1. L2PIT 407 shows the three address pairs and additional information for VPN B on PE 1.

Figure 5:
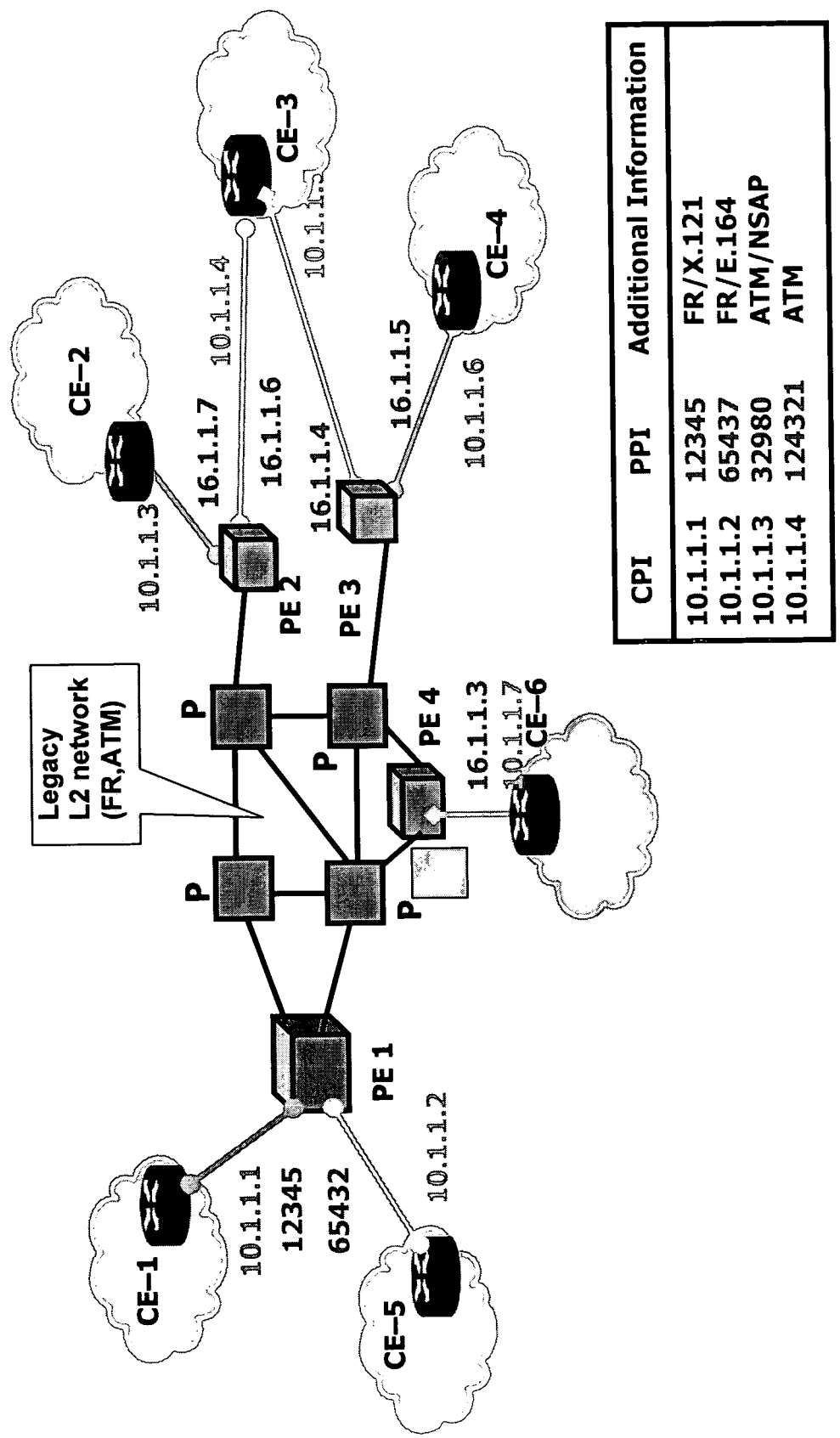
FIG. 5 is a diagram of a network depicting network addresses and Port Information Tables according to an alternative embodiment of the invention.

Referring to FIG. 5, there may be seen an example L2PIT for a network with legacy L2VPNs with addresses as indicated. On FIG. 5, L2PIT 501 shows the four address pairs and additional information for VPN A on PE 1.

Figure 6:
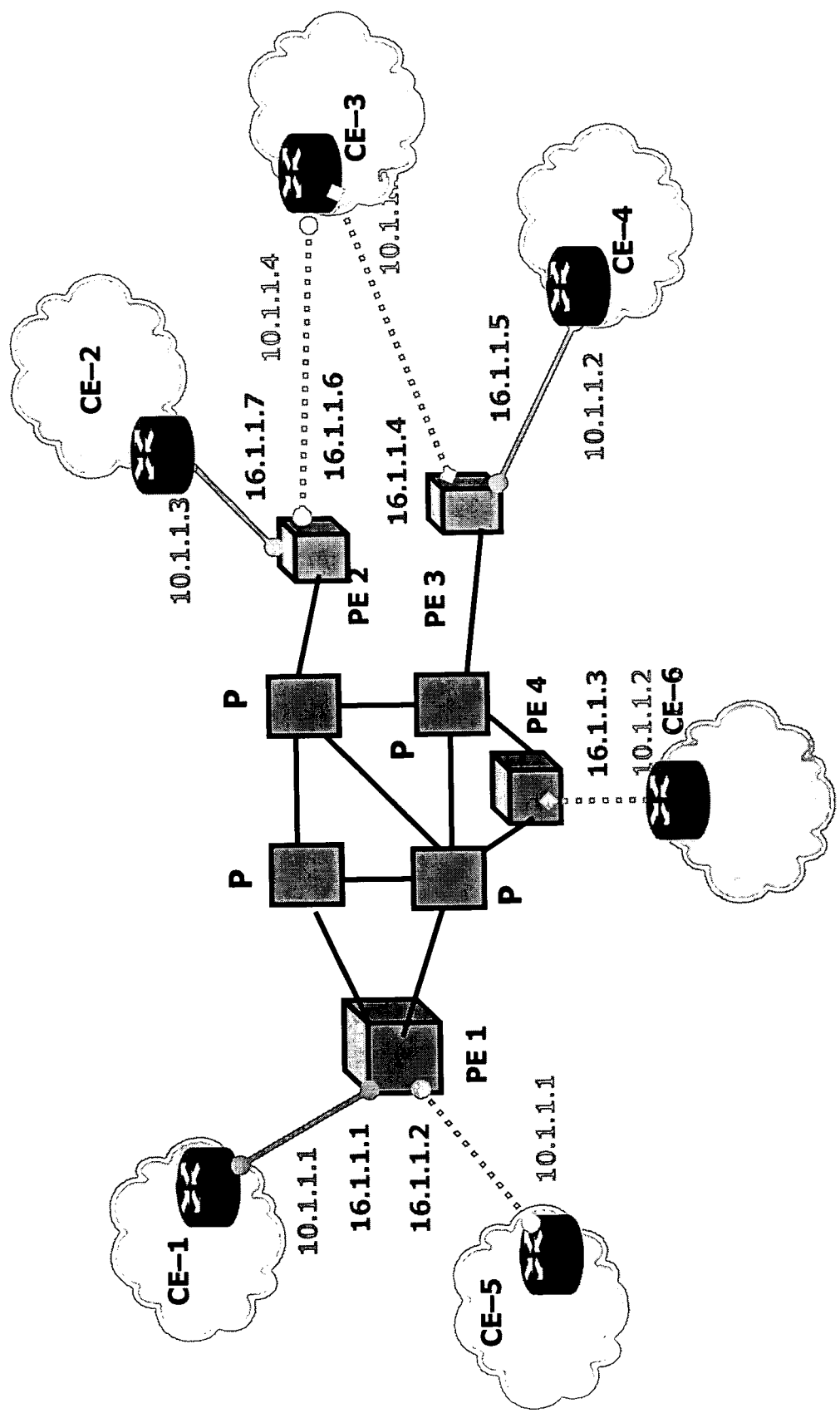
FIG. 6 is a diagram of a network depicting network addresses according to an embodiment of the invention.

Referring to FIGS. 6 and 7, there may be seen an example of how BGP may be used to update a set of L2PITs associated with PEs. In FIG. 6 a network with example addresses as indicated may be seen. The connections for VPN B are indicated as solid links. In FIG. 7 the three L2PITs associated with respective PE's may be seen. At point 701, the L2PITs have received their initial values from the local connection.

Next, a BGP update from PE 1 to PE 2 provides the following information:

<CPI=10.1.1.1, PPI=16.1.1.1, FR, Community=B>. At point 702, the updated information is reflected in the L2PITs.

Next, a BGP update from PE 1 to PE 3 provides the following information:

<CPI=10.1.1.1, PPI=16.1.1.1, FR, Community=B>. At point 703, the updated information is reflected in the L2PITs.

Next, a BGP update from PE 3 to PE 1 provides the following information:

<CPI=10.1.1.2, PPI=16.1.1.5, FR, Community=B>. At point 704, the updated information is reflected in the L2PITs.

Next, a BGP update from PE 2 to PE 1 provides the following information:

<CPI=10.1.1.3, PPI=16.1.1.7, FR, Community=B>. At point 705, the updated information is reflected in the L2PITs.

Next, a BGP update from PE 3 to PE 2 provides the following information:

<CPI=10.1.1.2, PPI 16.1.1.5, FR, Community=B>. At point 706, the updated information is reflected in the L2PITs.

Next, a BGP update from PE 2 to PE 3 provides the following information:

<CPI=10.1.1.3, PPI=16.1.1.7, FR, Community=B>. At point 707, the updated information is reflected in the L2PITs.

At this point all the L2PITs are fully populated.

A CE with one of its ports in a given L2VPN is provided with the information about all other customer Layer-2 ports of that L23VPN. This is provided by the local (directly connected) PE as part of the SVC-L2VPN service. The information includes CPIs of the ports and may also include information about characteristics of the channels within these ports e.g., FR, ATM, bandwidth, etc. The information represents a subset of the L2PIT that is maintained by the PE for the SVC-L2VPN and does not include PPI information. The CE acquires this information from its local PE by using a variety of methods such as BGP, LMP, or other similar mechanisms. The CE uses this information to establish the actual layer-2 connectivity.

Establishing connectivity between CEs is controlled by CEs. A CE with a port in a given SVC-L2VPN is not required to have a connection to every other CE with ports in that SVC-L2VPN. Connectivity is established when desired using the information that CE acquired from PE about other customer ports of that SVC-L2VPN.

A wide range of MPLS signalling protocols can be used including CR-LDP, RSVP-TE, and LDP-DOD although other signalling protocols are not excluded. The service provider uses their existing signalling protocols to establish the connection (e.g., Martini) once a request is initiated by a CE.

SVC-L2VPN Signalling comprises user-side signalling and network-side signalling. The user-side signalling is concerned with negotiating user-side Layer-2 parameters. The network-side signalling handles both legacy Layer-2 networks and IP/MPLS networks including both Martini VC signalling and single-sided signalling.

SVC-L2VPN can use concepts of single-sided signalling with some extensions. For an end to end connection, an SVC is established via bi-directional LSPs set-up between PEs representing the emulated VC. Each LSP is identified by, for example using terminology borrowed from single sided signalling, a tuple such as:

<{CPI,PPI},PE1,Attachment identifier VC1, PE2, Attachment Identifier VC2>

The LSP in the opposite direction will be identified by a tuple such as:

<PE2, Attachment identifier VC2, PE1, Attachment Identifier VC1>

The required SVC is built by the pair of such LSPs.

When a signalling message is sent from PE1 to PE2, and PE1 needs to refer to an Attachment Identifier which has been configured on one of its own Attachment VCs (or pools), the Attachment Identifier is called a "Source Attachment Identifier" (SAI). If PE1 needs to refer to an Attachment Identifier which has been configured on one of PE2's Attachment VCs (or pools), the Attachment Identifier is called a "Target Attachment Identifier" (TAI). The Martini signalling will carry the source CPI,PPI and the target CPI,PPI. A PE which receives a Label Mapping Message containing a TAI will be able to map that TAI uniquely to one of its Attachment VCs (or pools). The way in which a PE maps a TAI to an Attachment VC (or pool) is as follows:

First, the source CPI/PPI will be matched to the list of entries into the L2VPN PIT if a match is found, an Attachment Identifier is created for the VC, and a PATH message is sent to the CE. Second, a label mapping message is also sent to the remote endpoint with the source CPI, PPI taken from destination CPI,PPI of the first label mapping.

It is contemplated that SVC-l2VPN Extensions to MPLS Signalling may reuse some of the Martini draft with extensions of single sided signalling. For this to occur, then CE-PE extensions needs to carry the Type of Layer-2 circuits, needs to signal the type to the CE that the original CE may decide to initiate connectivity to, and needs to carry the CPI in the RSVP-TE/CR-LDP messages.

When Martini type signalling is used the following extensions are needed:
  the type of switched service;
  remote endpoint will need to signal the DLCI (data link connection identifier) to the CE;
  the CE may accept or terminate the VC; and
  the signalling needs to carry the <source CPI,PPI>,<target CPI,PPI>.

Figure 8:
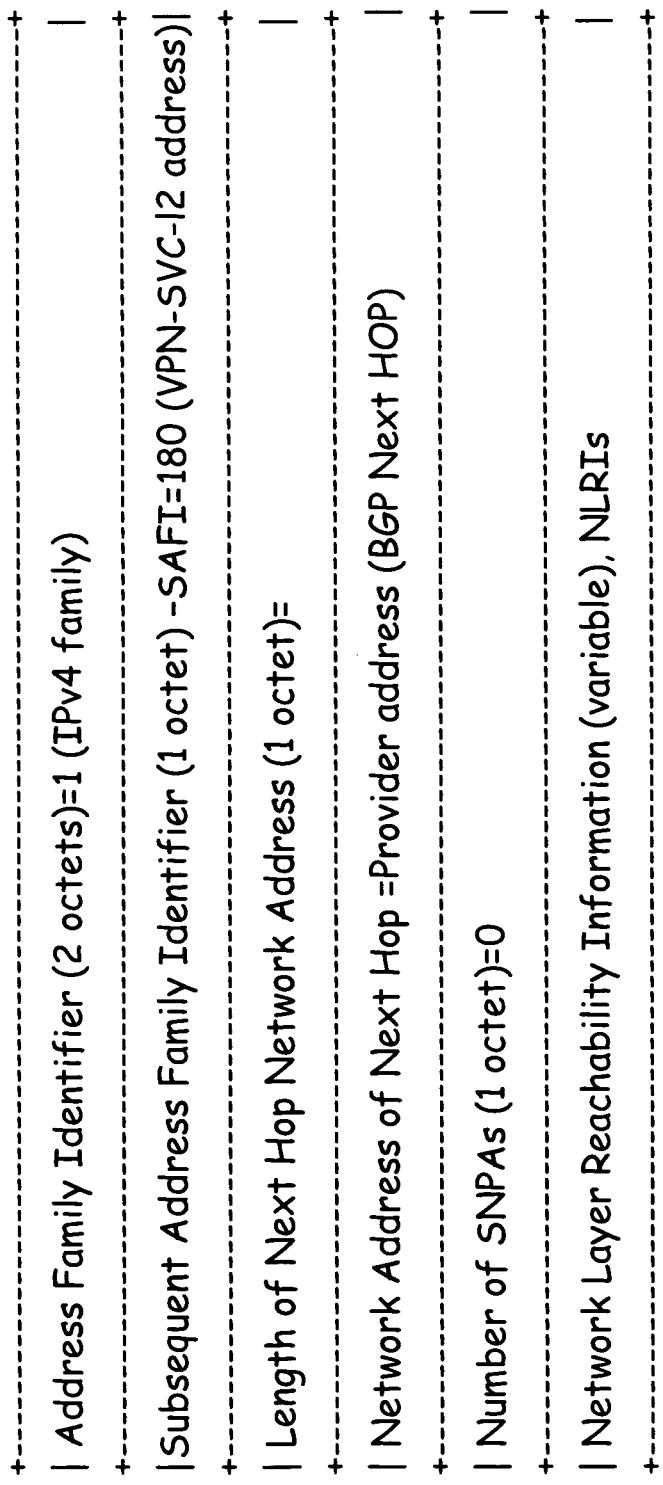
FIG. 8 is a table depicting an example BGP Update Message according to an embodiment of the invention.

FIG. 8 provides an example BGP Update message for a SVC-L2VPN MP_REACH_NLRI attribute.

Figure 9:
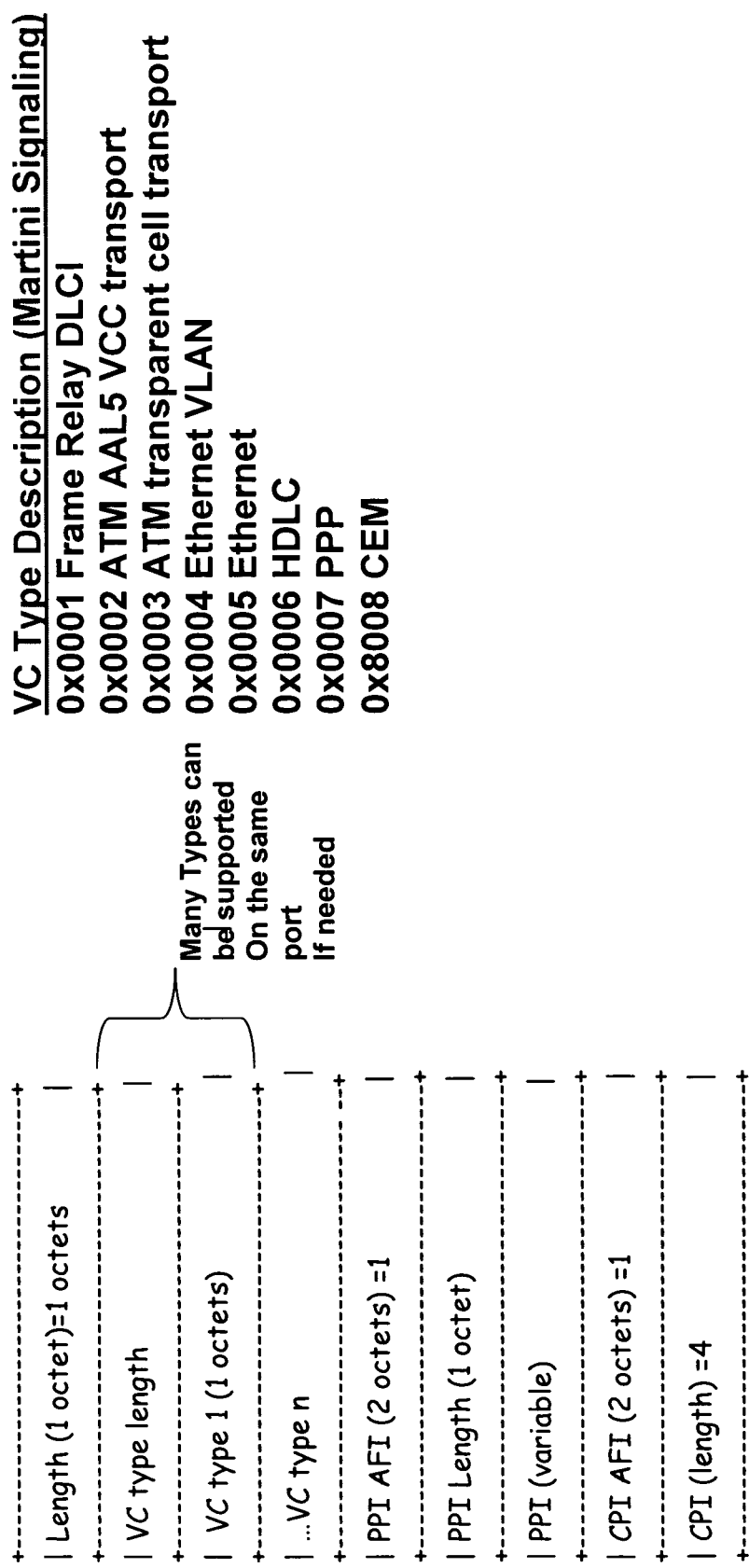
FIG. 9 is a table depicting an example SVC-L2VPN Network Layer Reach Information tuple according to an embodiment of the invention.

FIG. 9 provides an example SVC-L2VPN NLRI (Network Layer Reach Information) tuple. Optionally a Route Distinguisher (RD) may be encoded, but this is not strictly needed since PPI and CPI are normally unique to a given SVC L2VPN. If there is no PPI then an RD is necessary.

In the Frame Relay case, QoS requires Layer-2 Traffic Parameter negotiation. The following items needs to be signalled between CE-PE:
  Maximum outgoing and incoming frame information field size;
  Outgoing and incoming CIR;
  Minimum acceptable outgoing and incoming CIR;
  Outgoing and incoming committed burst size (Bc); and
  Outgoing and incoming excess burst size (Be).

In an alternative embodiment, Ethernet Point-to-Point SVCs may be established using the SVC-L2VPN arrangements discussed above. Since the virtual connection is accomplished through IP based mechanisms at the CE-PE, it is possible to establish Ethernet-based SVCs in the same manner as above. Likewise, VLAN point-to-point SVCs can also be supported.

While the invention has been described in conjunction with specific embodiments thereof, it is evident that many alternatives, modifications, and variations will be apparent to those skilled in the art in light of the foregoing description. Accordingly, it is intended to embrace all modifications, variations and adaptations such as may be made to the particular embodiments of the invention described above without departing from the scope of the invention, which is defined in the claims.

What is claimed is:

1. A network for providing on-demand Layer 2 Virtual Private Networks (VPNs), the network comprising:
  a plurality of interconnected provider edge devices, wherein:
    each provider edge device has at least one provider port;
    each provider port is associated with a respective provider port identifier;
    at least some of the provider ports of at least some of the provider edge devices are attached to respective customer ports of customer devices;
    each of the respective customer ports is associated with:
      a particular VPN among the layer 2 VPNs; and a respective customer port identifier that is unique within a customer port identifier space for the particular VPN;

the at least some of the provider edge devices having a respective port information table associated with the particular VPN; and the respective port information table comprises:
a respective mapping for each respective customer port identifier of each respective customer port associated with the particular VPN, each respective mapping associating the respective customer port identifier with the respective provider port identifier, the respective provider port identifier being associated with the respective provider port to which the respective customer port is attached; and
type information for a data link between the respective provider port and the respective customer port.

2. The network of claim 1, wherein each respective provider port identifier is unique within a provider port identifier space.

3. The network of claim 2, wherein:
the network provides plural VPNs; and
customer port identifier spaces for at least two of the plural VPNs overlap.

4. The network of claim 2, wherein:
each respective provider port identifier comprises a respective provider port address which is unique within a provider port address space; and
each respective customer port identifier associated with the particular VPN comprises a respective customer port address, which is unique within a customer address space for that particular VPN.

5. The network of claim 1, wherein the provider edge devices are interconnected through a shared network.

6. The network of claim 5, wherein the shared network comprises at least one provider core device.

7. The network of claim 1, wherein:
the provider edge devices are configured to receive signalling from customer edge devices having customer ports attached to provider ports of the provider edge devices, the signalling requesting connections across the network between customer ports having specified customer port identifiers; and
the provider edge devices are configured to respond to the received signalling based on mappings in their port information tables by exchanging signalling according to a signalling protocol to establish connections across the network between provider ports attached to the customer ports associated with the customer port identifiers specified in the signalling requesting the connections.

8. The network of claim 7, wherein the signalling protocol is a Multi-Protocol Label Switching (MPLS) signalling protocol.

9. The network of claim 1, wherein the provider edge devices are configured to exchange auto-discovery messages to populate the respective port information tables for the respective VPNs at the respective provider edge devices.

10. The network of claim 9, wherein the auto-discovery messages are Border Gateway Protocol (BGP) messages.

11. A method of operating a network to provide on-demand Layer 2 Virtual Private Networks (VPNs), the network comprising a plurality of interconnected provider edge devices, wherein:
each provider edge device has at least one provider port;
each provider port is associated with a respective provider port identifier;
at least some of the provider ports of at least some of the provider edge devices are attached to respective customer ports of customer devices;
each of the respective customer ports is associated with:
a particular VPN among the layer 2 VPNs; and
a respective customer port identifier that is unique within a customer port identifier space for the particular VPN;

the method comprising:
receiving, at each provider edge device, auto-discovery messages from the provider edge devices;
populating, based on information in the auto-discovery messages, a respective port information table associated with the particular VPN, the respective port information table comprising:
a respective mapping for each respective customer port identifier of each respective customer port associated with the particular VPN, each respective mapping associating the respective customer port identifier with the respective provider port identifier, the respective provider port identifier being associated with the respective provider port to which the respective customer port is attached; and
type information for a data link between the respective provider port and the respective customer port; and
transmitting auto-discovery messages to the provider edge devices, the auto-discovery messages allowing the provider edge devices to populate the respective port information tables.

12. The method of claim 11, wherein each respective provider port identifier is unique within a provider port identifier space.

13. The method of claim 12, wherein:
the network provides plural VPNs; and
customer port identifier spaces for at least two of the plural VPNs overlap.

14. The method of claim 12, wherein:
each respective provider port identifier comprises a respective provider port address which is unique within a provider port address space; and
each respective customer port identifier associated with the particular VPN comprises a respective customer port address which is unique within a customer address space for that particular VPN.

15. The method of claim 11, wherein the provider edge devices are interconnected through a shared network.

16. The method of claim 15, wherein the shared network comprises at least one provider core device.

17. The method of claim 11, comprising:
receiving, at the provider edge devices from customer edge devices having customer ports attached to provider ports of the provider edge devices, signalling requesting connections across the network between customer ports having specified customer port identifiers; and
responding to the received signalling based on mappings in their port information tables by exchanging signalling between provider edge devices according to a signalling protocol to establish connections across the network between provider ports attached to the customer ports associated with the customer port identifiers specified in the signalling requesting the connections.

18. The method of claim 17, wherein the signalling protocol is a Multi-Protocol Label Switching (MPLS) signalling protocol.

19. The method of claim 11, wherein the auto-discovery messages are Border Gateway Protocol (BGP) messages.

20. A provider edge device for use in a network for providing on-demand Layer 2 Virtual Private Networks (VPNs), the provider edge device comprising:
- a physical port associated with at least one provider logical port for attachment to a respective customer logical port of a customer device, each provider logical port being associated with a respective provider port identifier, and each respective customer logical port being associated with a particular VPN among the layer 2 VPNs; and a respective customer port identifier that is unique within a customer port identifier space for the particular VPN; and
- a respective port information table associated with the particular VPN, each respective port information table comprising:
  - a respective mapping for each customer port identifier of each respective customer logical port associated with the particular VPN, each respective mapping associating the respective customer port identifier with the respective provider port identifier, the respective provider port identifier being associated with the respective provider logical port to which the respective customer logical port is attached; and
  - type information for a data link between the respective provider logical port and the respective customer logical port.

21. The provider edge device of claim 20, wherein each respective provider port identifier is unique within a provider port identifier space.

22. The provider edge device of claim 21, wherein:
the provider edge device provides plural VPNs; and
customer port identifier spaces for at least two of the plural VPNs overlap.

23. The provider edge device of claim 21, wherein:
each respective provider port identifier comprises a respective provider port address which is unique within a provider port address space; and
each respective customer port identifier associated with the particular VPN comprises a respective customer port address which is unique within a customer address space for that particular VPN.

24. The provider edge device of claim 20, wherein:
the provider edge device is configured to receive signalling from at least one customer edge device having a customer port attached to a provider port of the provider edge device, the signalling requesting connections across the network between customer ports having specified customer port identifiers; and
the provider edge device is configured to respond to the received signalling based on mappings in one of its port information tables by exchanging signalling with at least one other provider edge node according to a signalling protocol to establish connections across the network between provider ports attached to the customer ports associated with the customer port identifiers specified in the signalling requesting the connections.

25. The provider edge device of claim 24, wherein the signalling protocol is a Multi-Protocol Label Switching (MPLS) signalling protocol.

26. The provider edge device of claim 20, wherein the provider edge device is configured to exchange auto-discovery messages with other provider edge devices to populate the respective port information tables for the respective VPNs at the respective provider edge devices.

27. The provider edge device of claim 26, wherein the auto-discovery messages are Border Gateway Protocol (BGP) messages.

28. A method of operating a provider edge device of a network to provide on-demand Layer 2 Virtual Private Networks (VPNs), wherein:
the provider edge device has at least one provider port for attachment to a respective customer port of a customer device,
each provider port being associated with a respective provider port identifier, and
each customer port being associated with:
  a particular VPN among the layer 2 VPNs; and
  a respective customer port identifier that is unique within a customer port identifier space for the particular VPN;
the method comprising:
  receiving, at the provider edge device, auto-discovery messages from other provider edge devices;
  populating, based on information in the auto-discovery messages, a respective port information table associated with the particular VPN, the respective port information table comprising:
    a respective mapping for each respective customer port identifier of each respective customer port associated with the particular VPN, each respective mapping associating the respective customer port identifier with the respective provider port identifier, the respective provider port identifier being associated with the respective provider port to which the respective customer port is attached; and
    type information for a data link between the respective provider port and the respective customer port; and
  transmitting auto-discovery messages to another provider edge device, the auto-discovery messages allowing the another provider edge device to populate the respective port information table.

29. The method of claim 28, wherein each respective provider port identifier is unique within a provider port identifier space.

30. The method of claim 29, wherein:
the network provides plural VPNs; and
customer port identifier spaces for at least two of the plural VPNs overlap.

31. The method of claim 29, wherein:
each respective provider port identifier comprises a respective provider port address which is unique within a provider port address space; and
each respective customer port identifier associated with the particular VPN comprises a respective customer port address which is unique within a customer address space for that particular VPN.

32. The method of claim 28, comprising:
receiving, at the provider edge device from a customer edge device having a customer port attached to a provider port of the provider edge device, signalling requesting a connection across the network between customer ports having specified customer port identifiers; and
responding, by the provider edge device, to the received signalling based on a mapping in one of its port information tables by exchanging signalling with another provider edge device according to a signalling protocol to establish a connection across the network between provider ports attached to the customer ports associated with the customer port identifiers specified in the signalling requesting the connections.

33. The method of claim 32, wherein the signalling protocol is a Multi-Protocol Label Switching (MPLS) signalling protocol.

34. The method of claim 28, wherein the auto-discovery messages are Border Gateway Protocol (BGP) messages.

\* \* \* \* \*